US012110368B2

(12) United States Patent
Weber et al.

(10) Patent No.: US 12,110,368 B2
(45) Date of Patent: Oct. 8, 2024

(54) POLYARYLENE ETHER SULFONE

(71) Applicant: BASF SE, Ludwigshafen am Rhein (DE)

(72) Inventors: Martin Weber, Ludwigshafen am Rhein (DE); Christian Maletzko, Ludwigshafen am Rhein (DE); Rene Backes, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 722 days.

(21) Appl. No.: 17/275,070

(22) PCT Filed: Sep. 6, 2019

(86) PCT No.: PCT/EP2019/073783
§ 371 (c)(1),
(2) Date: Mar. 10, 2021

(87) PCT Pub. No.: WO2020/053077
PCT Pub. Date: Mar. 19, 2020

(65) Prior Publication Data
US 2022/0056216 A1  Feb. 24, 2022

(30) Foreign Application Priority Data
Sep. 11, 2018  (EP) .................................... 18193780

(51) Int. Cl.
| | |
|---|---|
| *C08G 75/23* | (2006.01) |
| *A23L 2/74* | (2006.01) |
| *B01D 69/08* | (2006.01) |
| *B01D 71/68* | (2006.01) |
| *C02F 1/44* | (2023.01) |
| *C08G 65/40* | (2006.01) |
| *D01F 6/76* | (2006.01) |

(52) U.S. Cl.
CPC ................ *C08G 75/23* (2013.01); *A23L 2/74* (2013.01); *B01D 69/08* (2013.01); *B01D 71/68* (2013.01); *C02F 1/44* (2013.01); *C08G 65/4056* (2013.01); *D01F 6/765* (2013.01); *A23V 2002/00* (2013.01); *D10B 2505/04* (2013.01)

(58) Field of Classification Search
USPC ......................................................... 528/175
See application file for complete search history.

(56) References Cited

U.S. PATENT DOCUMENTS

| | | | |
|---|---|---|---|
| 7,163,987 | B2 | 1/2007 | Weber et al. |
| 2015/0094477 | A1 | 4/2015 | Jung et al. |
| 2015/0299395 | A1 | 10/2015 | Taylor et al. |
| 2015/0322210 | A1 | 11/2015 | Sriram et al. |
| 2017/0240708 | A1 | 8/2017 | Lim et al. |

FOREIGN PATENT DOCUMENTS

| | | |
|---|---|---|
| CN | 103506016 A | 1/2014 |
| CN | 104327277 A | 2/2015 |
| CN | 104428274 A | 3/2015 |
| EP | 1561768 A1 | 8/2005 |
| EP | 3088442 A1 * | 11/2016 |
| EP | 3170855 A1 | 5/2017 |
| JP | 05-001149 A | 1/1993 |
| WO | 2002/025764 A1 | 3/2002 |
| WO | 2014/072473 A2 | 5/2014 |
| WO | 2016/066661 A1 | 5/2016 |
| WO | 2017/157933 A1 | 9/2017 |

OTHER PUBLICATIONS

Abderrazak, et al., "Synthesis of New Poly(ether ketone)s Derived from Biobased Diols", Macromolecular Chemistry and Physics, vol. 214, Issue 13, Jun. 7, 2013, pp. 1423-1433.
Al-Omran, et al., "Synthesis and sulfonation of poly(phenylene ether ether sulfone)s containing methylated hydroquinone residues", Polymer, vol. 37, Issue 9, Apr. 1996, pp. 1735-1743.
Belgacem, et al., "Copolyethersulfones of 1,4:3,6-dianhydrohexitols and bisphenol A", Designed Monomers and Polymers, vol. 19, Issue 3, Jan. 29, 2016, pp. 248-255.
Chatti, et al., "Poly(ether sulfone) of Isosorbide, Isomannide and Isoidide", High Performance Polymers, vol. 21, Issue 1, Apr. 2, 2008, pp. 105-118.
El-Hibri, et al., "Polysulfones", Encyclopedia of Polymer Science and Technology, ed. Herman F. Mark, 3rd Edition, vol. 4, 2003, pp. 1-26.
European Search Report for EP Patent Application No. 18193780.6, Issued on Feb. 1, 2019, 4 pages.
Hans R. Kricheldorf, "Chapter 7: Aromatic polyethers", Handbook of Polymer Synthesis, ed. Kricheldorf, et al., 2nd Edition, 2005, pp. 427-501.
International Preliminary Report on Patentability received for PCT Patent Application No. PCT/EP2019/073783, mailed on Sep. 28, 2020, 6 pages.
International Search Report and Written Opinion received for PCT Patent Application No. PCT/EP19/073783, mailed on Dec. 17, 2019, 9 pages.
Kricheldorf, et al., "New polymer syntheses. LXXXII. Syntheses of poly(ether-sulfone)s from silylated aliphatic diols including chiral monomers", Journal of Polymer Science Part A: Polymer Chemistry, vol. 33, Issue 15, Nov. 15, 1995, pp. 2667-2671.
Noshay, et al., "Polysulfone-polydimethylsiloxane block copolymers", Journal of Polymer Science Part A-1: Polymer Chemistry, vol. 9, Issue 11, Nov. 1971, pp. 3147-3159.
Saber Chatti et al.: "Poly(ether sulfone) of Isosorbide, Isomannide and Isoidide", High Performance Polymers, Institute of Physics Publishing, Bristol, GB, vol. 21, No. 1, Feb. 1, 2009 (Feb. 1, 2009), pp. 105-118.

(Continued)

*Primary Examiner* — Terressa Boykin
(74) *Attorney, Agent, or Firm* — Faegre Drinker Biddle & Reath LLP

(57) ABSTRACT

A polyarylene ether sulfone comprising in polymerized form A) isosorbide, isomannide, isoidide or a mixture thereof and B) at least one nonsulfonated dihalodiaryl sulfone (compound B) and C) at least one sulfonated dihalodiaryl sulfone (compound C), a process for its preparation and its use in the preparation of coatings, films, fibers, foams, membranes or molded articles.

15 Claims, No Drawings

(56) References Cited

OTHER PUBLICATIONS

Mswanathan, et al., "Synthesis, kinetic observations and characteristics of polyarylene ether sulphones prepared via a potassium carbonate DMAC process", Polymer, vol. 25, Issue 12, Dec. 1984, pp. 1827-1836.
Herman L. Wagner, "The Mark-Houwink-Sakurada Equation for the Viscosity of Atactic Polystyrene", Journal of physical and chemical reference data, vol. 14, Issue 4, Oct. 1985, pp. 611-617.
Ueda et al., "Synthesis and characterization of aromatic poly(ether sulfone)s containing pendant sodium sulfonate groups", Journal of Polymer Science Part A: Polymer Chemistry, vol. 31, Issue 4, Mar. 30, 1993, pp. 853-858.

\* cited by examiner

POLYARYLENE ETHER SULFONE

CROSS-REFERENCE TO RELATED APPLICATIONS

This application is a national stage application (under 35 U.S.C. § 371) of PCT/EP2019/073783, filed Sep. 6, 2019, which claims benefit of European Application No. 18193780.6, filed Sep. 11, 2018, both of which are incorporated herein by reference in their entirety.

The present invention relates to a sulfonated polyarylene ether sulfone based on diols which are derived from an anhydro sugar and one or more sulfonated dihalodiarylsulfones.

Polyarylene ether sulfones and polyarylene ether ketones are classified as high-performance thermoplastics. In several scientific publications the preparation and the properties of polyarylene ether sulfones and polyarylene ether ketones derived from biobased diols are disclosed (Kricheldorf et al. J Polm. Sci. Part A: Polymer Chemistry, Vol 33, 2667-2671 (1995); Chatti et al., High Performance Polymers, 21: 105-118, 2009; Abderrazak et al. Macromol. Chem. Phys. 2013, 214, 1423-1433; Belgacem et al. Designed Monomers and Polymers, 2016, Vol 19, No. 3, 248-255). Polyarylene ether sulfones derived from 1,4:3,6-dianhydrohexitols are also disclosed in WO 2014/072473 and US 2017/0240708 A1. Rose et al., Polymer 1996, Vol. 37, No. 9, pp. 1735-1743 describe the preparation of sulfonated methylated polyarylene ether sulfones, using, among others, trimethylhydroquinone and 4-dichlorodiphenylsulfone in the presence of potassium carbonate. The polymerization is carried out in the presence of sulfolane and toluene under nitrogen atmosphere. Compositions comprising up to 20% by weight (wt %) of a polyarylene ether sulfone containing up to 10 wt % of units derived from 1,1,1-tris(4-hydroxyphenyl) ethane are known from U.S. Pat. No. 7,163,987 B2.

The problem addressed by the present disclosure is to present a new polyarylene ether which comprises at least one —SO$_2$-group and which is derived from isosorbide, isomannide, isoidide or a mixture thereof. Moreover, said polyarylene ether should have high molecular weight as well as high hydrophilicity. One motivation was to present a new polyarylene ether is suitable for the manufacture of membranes. Membranes having good separation properties in combination with a high permeability were aimed at, in particular for the use in contact with water, a body fluid or a liquid in food production. Further, a process for the manufacture of said new polyarylene ether in good yield within an industrially acceptable reaction time should be provided.

Hereinunder a polyarylene ether sulfone is disclosed which comprises in polymerized form
A) isosorbide, isomannide, isoidide or a mixture thereof, and
B) least one difunctional compound comprising at least one non-sulfonated dihalodiaryl sulfone, and
C) at least one sulfonated dihalodiaryl sulfone.

Further, a process is disclosed for the manufacture of a polyarylene ether sulfone which comprises reacting a) isosorbide, isomannide, isoidide or a mixture thereof and b) at least one difunctional compound comprising a at least one sulfonated dihalodiaryl sulfone, and with c) at least one sulfonated dihalodiaryl sulfone. The use of at least one of said, respectively the so obtained, polyarylene ether sulfone in the manufacture or for the manufacture of a coating, fiber, film, foam, membrane or molded article as well as a fiber or membrane comprising at least one of said or the so obtained polyarylene ether sulfone is disclosed as well. Moreover, a fiber and a membrane comprising said polyarylene ether sulfone is disclosed. Further an article comprising at least one of said membrane is disclosed. In addition, the use of said membrane in contact with water, a body fluid or a liquid in food production is disclosed.

In the following "at least one" in general means one or two or more, such as three or four or five or more, wherein more may mean a plurality or an uncountable. For instance, "at least one" may mean one or a mixture of two or more. If used in connection with chemical compounds "at least one" is meant in the sense that one or two or more chemical compounds differing in their chemical constitution, that is chemical nature, are described.

The person skilled in the art appreciates that any polymer, may it be a homopolymer or a copolymer by nature typically is a mixture of polymeric individuals differing in their constitution such as chain length, degree of branching or nature of end groups. This fact is also often described as distribution. Thus, in the following "at least one" as prefix to a polymer means that different types of polymers may be encompassed whereby each type may have a certain distribution addressed above.

The person skilled in the art further appreciates that any polymer is derived from monomers or oligomers or mixtures thereof which the polymer then comprises in reacted, polymerized form.

In the following
compound A is isosorbide, isomannide, isoidide or a mixture thereof;
compound B is at least one difunctional compound comprising at least one non-sulfonated dihalodiaryl sulfone
compound C is at least one sulfonated dihalodiaryl sulfone
compound D is at least one compound having two hydroxy groups and which is not compound A
compound E is at least one tri- or higher functional compound;
compound F at least one compound with one functional group reactive towards reactive groups comprised in a polymeric chain
starting compounds are compound A, B, C and if present compounds D and/or E prior to being polymerized
solvent L is at least one solvent
In the following the term functional group does not encompass a group resulting from the sulfonation of a dihalodiaryl sulfone.

A suitable polyarylene ether sulfone useful according to the invention comprises compound A in polymerized form.
Compound A Compound A is isosorbide, isomannide, isoidide or a mixture thereof. Compound A is known to those skilled in the art. Isosorbide, isomannide and isoidide belong to the family of 1,4:3,6-dianhydrohexitols and are of formula I:

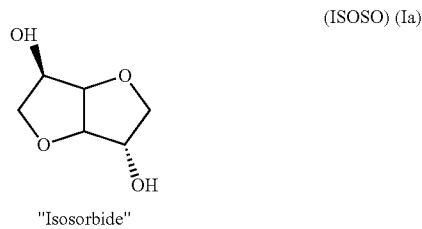

(ISOSO) (Ia)

"Isosorbide"

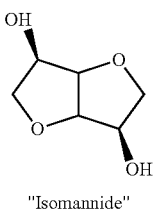

"Isomannide" (ISOMA) (Ib)

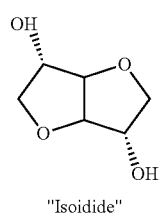

"Isoidide" (ISOID) (Ic)

Depending on the desired properties such as glass transition temperature and the modulation thereof the polyarylene ether sulfone may comprise as compound A one or a mixture of two or of all three of said dianhydrohexitols. Thus, for instance it may comprise isosorbide and isomannide, isosorbide and isoidide or isomannide and isoidide. It may be preferred that only isosorbide, isomannide or isoidide is comprised. Isosorbide may be most preferred for instance for the fact that it is commercially available and the thermal stability which it may impart to the polyarylene ether sulfone. Isoidide may have advantages with respect to ease of reaction.

The polyarylene ether sulfone may comprise compound A as the sole diol. It is also possible that in addition the polyarylene ether sulfone is derived from at least one further compound which is difunctional and has two hydroxy groups, that is a diol which is not compound A and not compound C (compound D) and which is comprised in the polyarylene ether sulfone in polymerized form. It may be possible that the polyarylene ether sulfone is derived from 5 to 100 mol % of compound A, based on the total weight of starting material of compounds A and D. It may be more preferred that the polyarylene ether sulfone is derived from 25 to 100 mol %, most preferably from 50 to 100 mol % of compound A, based on the total weight of starting material of compounds A and D. In particular, if a polyarylene ether sulfone is sought for the manufacture of products for contact with water, liquids in food production or the medicinal field, more specifically for the production of hollow fibers or membranes in said fields, it may be advantageous that it comprises compound A as the sole diol in the polyarylene ether sulfone.

The polyarylene ether sulfone comprises in polymerized form at least one difunctional compound comprising a non-sulfonate dihalodiaryl sulfone (compound B).

Compound B

Compound B is known or if not known per se it may be prepared by methods known to those skilled in the art. Compound B is a difunctional compound. "Difunctional" means that it has two functional groups that are reactive towards compounds A and if present compounds D and/or E. Generally compound B is not subject to any fundamental restriction, provided that it is sufficiently reactive within a nucleophilic aromatic substitution.

Compound B comprises at least one non-sulfonated dihalodiaryl sulfone. In addition, compound B can for instance comprise at least one compound which is difunctional and allows the preparation of a polyarylene ether sulfone which comprises —CO—, —S—, S═O, —N═N—, and/or —$CR^aR^b$— groups.

While other halogen groups are possible typically fluorine and/or chlorine are the preferred halogen, whereby chlorine is the most preferred halogen, in the at least one non-sulfonated dihalodiaryl sulfone.

Compound B can be at least one, for instance be one or more non-sulfonated dihalodiaryl sulfones, such as 1 to 3 non-sulfonated dihalodiaryl sulfones, whereby 1 or 2 non-sulfonated dihalodiaryl sulfones, in particular one may be preferred. It is also possible that compound B is a mixture of at least 50 mol % of at least one dihalodiaryl sulfone and less than 50 mol % of at least one non-sulfonated dihalodiaryl ketone. For instance, compound B can be a mixture of from 50 mol-% such as 60 mol % to 80 mol-% or more, such as 90 mol % of at least non-sulfonated one dihalodiaryl sulfone and the remainder being at least one dihalodiaryl ketone, such as 1 to 3, whereby 1 or 2, in particular one dihalodiaryl ketone may be preferred.

Suitable compound B can especially be at least one, whereby one may be preferred, dihalodiphenyl sulfone such as 4,4'-dichlorodiphenyl sulfone, 4,4'-difluorodiphenyl sulfone, 4,4'-dibromodiphenyl sulfone, bis(2-chlorophenyl) sulfones, 2,2'-dichlorodiphenyl sulfone, 2,2'-difluorodiphenyl sulfone, particular preference can be given to 4,4'-dichlorodiphenyl sulfone or 4,4'-difluorodiphenyl sulfone. If a polyarylene ether sulfone of the PESU type (see below) is sought compound B can be 4,4'-dichlorodiphenyl sulfone (DCDPS).

The polyarylene ether sulfone comprises in polymerized form at least one sulfonated dihalodiaryl sulfone (compound C).

Compound C

Compound C is at least one sulfonated dihalodiaryl sulfone. Preferably compound C is at least one sulfonated dichlorodiaryl sulfone. "Sulfonated" within the context of the present invention means that the at least one dihalodiaryl sulfone comprises at least one group resulting from the sulfonation of the at least one dihalodiaryl sulfone. The sulfonation of aromatic dihalogen sulfones is known to the skilled person. In particular, "sulfonated" means that at least one dihalodiaryl sulfone comprises at least one —$SO_3X$ group wherein X is hydrogen or a cation equivalent.

"Cation equivalent" within the context of the present disclosure means a cation of a single positive charge or one charge equivalent of a cation with two or more positive charges, for example $Li^+$, $Na^+$, $K^+$, $Mg^{2+}$, $Ca^{2+}$, $NH_4^+$, preferably $Na^+$, $K^+$.

"At least one —$SO_3X$ group" may mean one —$SO_3X$ group and also two or more —$SO_3X$ groups. Generally, it is preferred that it means two —$SO_3X$ groups. This means that the at least one dihalodiaryl sulfone is preferably at least one disulfonated dihalodiaryl sulfone.

The terms "sulfonic acid" and "—$SO_3X$ group" in the context of compound C are used synonymously and have the same meaning. The term "sulfonic acid" in the 4,4'-dichlorodiphenyl sulfone-3,3'-disulfonic acid and 4,4'-difluorodiphenyl sulfone-3,3'-disulfonic acid therefore means "—$SO_3X$ group" wherein X is hydrogen or a cation equivalent.

Preferably at least 50 wt % of compound C may be 4,4'-dichlorodiphenyl sulfone-3,3'-disulfonic acid, 4,4'-difluorodiphenyl sulfone-3,3'-disulfonic acid, 4,4'-dichloro-diphenylsulfone-3,3'-disulfonic acid disodium salt, 4,4'-dichlorodiphenylsulfone-3,3'-disulfonic acid dipotassium salt, 4,4'-difluorodiphenylsulfone-3,3'-disulfonic acid, 4,4'-difluorodiphenylsulfone-3,3'-disulfonic acid disodium salt or 4,4'-difluorodiphenylsulfone-3,3'-disulfonic acid dipotassium salt or a mixture thereof, whereby one thereof may be preferred. Particularly preferably compound C may comprise at least 80 wt-%, preferably at least 90 w-%, more preferably at least 98 wt-% of at least one of said sulfonated dihaldiaryl sulfones. It may further particularly be preferred that compound C consists essentially of at least one of said sulfonated dihaldiaryl sulfones. For instance 4,4'-dichlorodiphenylsulfone-3,3'-disulfonic acid or 4,4'-dichlorodiphenylsulfone-3,3'-disulfonic acid disodium salt or a mixture thereof may particularly be preferred as compound C.

Further it may particularly preferred that compound C consists of 4,4'-dichlorodiphenyl sulfone-3,3'-sulfonic acid or 4,4'-dichlorodiphenylsulfone-3,3'-disulfonic acid disodium salt.

The polyarylene ether sulfone can comprise compound C in a wide molar ratio, based on the sum of moles compounds B and C. The amount of C comprised in the polyarylene ether sulfone typically depends on its desired hydrophilicity. A polyarylene ether sulfone suitable in particular for the manufacture of membranes may for instance comprise from 1 to 20 mol-% of compound C, based on the sum of moles of compounds B and C. It may be more preferred that the polyarylene ether sulfone comprises from 2 to 15 mol-%, based on the sum of moles of compounds B and C. Polyarylene ether sulfones which comprise from 1 to 10 mol %, in particular 2 to 5 mol %, based on the sum of moles of compounds B and C may be preferred with respect to the desired properties, specifically with respect to high Tg at low solution viscosity as well as the manufacture of membranes, specifically porous membranes.

Compound D

Compound D is at least one compound having two hydroxy groups and which is not compound A. Compound D can be an aliphatic compound which is not compound A or it can be an aromatic compound. Generally, compound D can preferably be an aromatic compound. It may for instance be a dihydroxy arylene sulfone or a dihydroxyarylene ketone.

The following compounds are examples for compound D which may be preferred:
 a dihydroxybenzene, especially hydroquinone and resorcinol;
 a dihydroxynaphthalene, especially 1,5-dihydroxynaphthalene,1,6-dihydroxynaphthalene, 1,7-dihydroxynaphthalene, and 2,7-dihydroxynaphthalene;
 a dihydroxybiphenyl, especially 4,4'-biphenol and 2,2'-biphenol;
 a bisphenyl ether, especially bis(4-hydroxyphenyl) ether and bis(2-hydroxyphenyl) ether;
 a bisphenylpropane, especially 2,2-bis(4-hydroxyphenyl) propane, 2,2-bis(3-methyl-4-hydroxyphenyl)propane and 2,2-bis(3,5-dimethyl-4-hydroxyphenyl)propane;
 a bisphenylmethane, especially bis(4-hydroxyphenyl) methane;
 a bisphenyl sulfone, especially bis(4-hydroxyphenyl) sulfone;
 a bisphenyl sulfide, especially bis(4-hydroxyphenyl) sulfide;
 a bisphenyl ketone, especially bis(4-hydroxyphenyl) ketone;
 a bisphenylhexafluoropropane, especially 2,2-bis(3,5-dimethyl-4-hydroxyphenyl) hexafluoropropane; and
 a bisphenylfluorene, especially 9,9-bis(4-hydroxyphenyl) fluorene.

Compound D may preferably be hydroquinone, resorcinol, dihydroxynaphthalene, especially 2,7-dihydroxynaphthalene, 4,4'-biphenol or a mixture thereof.

While as compound D a mixture of two or more diols can be comprised in the polyarylene ether sulfone it may be preferred that only one is comprised, which may most preferably be hydrochinone or 4,4'-biphenol.

The polyarylene ether sulfone can comprise at least one tri- or higher functional compound (compound E).

Compound E

The at least one tri- or higher functional compound (compound E) which is comprised in the polyarylene ether sulfone is known to or if not known per se can be prepared by methods known to those skilled in art. Compound E can lead to a branched polyarylene ether sulfone. Thus, it may be a branching agent. While the polyarylene ether sulfone disclosed can be branched it is typically not crosslinked. In case it is crosslinked then mostly to a minor or very minor extend. Compound E may be a monomer or an oligomer. Compound E has three or more functional groups. The number of functional groups as well as their nature and the amount of compound E can influence the branching of the polyarylene ether sulfone. It is often preferred that the at least one compound E has 3 to 6, such functional groups. It may be more preferred that compound E has 3 or 4 functional groups if a less branched polyarylene ether sulfone is aimed at. If minor branching is desired it can be of particular advantage that the at least one compound E is a trifunctional compound. By way of the functional groups and depending on their nature the at least one tri- or higher functional compound can react with compounds, A, B, C, and if present compound D.

A typical suitable functional group, such as a hydroxy, nitro or halogen group, is capable of substitution under the condition of polyarylene ether sulfone manufacture. Compound E can have functional groups of different nature. This can be advantageous if it is desired to control the branching by way of the differing reactivity of the functional groups. It is also possible that all functional groups of compound E are the same. These may show equal reactivity but depending on the chemical constitution of compound E said functional groups may still differ in their reactivity during a polymerization reaction. Hydroxy and/or halogen groups may be preferred. Among the halogen groups chlorine is usually preferred. Compound E which has 3 to 6, specifically 3 or 4 hydroxy and/or halogen groups may by most preferred. It may be very preferable that compound E has three hydroxy groups, thus that it is a triol.

Compound E can be an aromatic compound. An aromatic compound may be preferred if the polyarylene ether sulfone is intended for the production of a high temperature resistant and/or sterilizable coating, film, fiber, foam, membrane or molded article.

As compound E of the type of aromatic compounds containing three or more than three hydroxy groups there may be mentioned: phloroglucin, 4,6-dimethyl-2,4,6-tri-(4-hydroxy-5 phenyl)-heptene-2 (trimeric isopropenylphenol), 4,6-dimethyl-2,4,6-(4-hydroxyphenyl)-heptane (hydrogenated trimeric isopropenyl phenol), 1,3,5-tri-(4-hydroxyphenyl)-benzene, 1,1,1-tris-(4-hydroxyphenyl)-ethane, 1,1,1-tris-(4-hydroxyphenyl)-propane, tetra-(4-hydroxyphenyl)-methane, 1,4-bis-(4', 4"-dihydroxytriphenyl)-methyl]-benzene and 2,2-bis-[4,4'-bis-(4-hydroxyphenyl)-cyclohexyl]-propane. Trivalent or more than trivalent phenols which can be prepared by the reaction of p-alkylsubstituted monophenols having unsubstituted o-positions with formaldehyde or formaldehyde-yielding compounds may also be suitable, such as, the trisphenol from p-cresol and formaldehyde- the 2,6-bis-(2'-hydroxy-5'-methylbenzyl)-4-methylphenol. Other examples of suitable aromatic compounds include 2,6-bis-(2'-hydroxy-5'-isopropyl-1-benzyl)-4-isopropenyl 1-phenol and bis-hydroxy-3-(2'-hydroxy-5'-methylbenzyl-5-methylphenyl]-methane.

Examples for compound E of the type of aromatic compounds having halogen groups are: 1,3,5-tris-(4-chlorophenyl-sulphonyl)-benzene, 2,4,4'-trichlorodiphenyl sulphone, 1-chloro-2,6-bis-(4-chlorophenyl-sulphonyl)-benzene. 1,1,1-trishydroxyphenyl ethane (THPE) may be of particular interest from the aspects of being an aromatic compound, its ease to react under the conditions of polyarylene ether sulfone manufacture and industrial availability. THPE can promote the progress of polymerization between compound A and compounds B and C and may for this reason be very advantageous. Moreover, in a poylarylene ether sulfone for use in fields in which health safety aspects are of importance such as in contact with water, or liquids in food industry or in the medical field THPE may be advantageously employed.

For the purpose of varying the branching quality a mixture of different tri- or higher functional compounds can be comprised in the polyarylene ether sulfone. Thus, for instance 2 to 5, such as 2 to 4 tri- or higher functional compounds can be comprised. It may be preferred that 2 or 3 tri- or higher functional compounds are comprised. From an aspect of complexity of industrial production, it may be more preferred that two tri- or higher functional compounds, in particular only one tri- or higher functional compound are respectively is comprised.

The amount of compound E can vary. If too little thereof is comprised in general the molecular weight of the polyarylene ether sulfone remains in a range that may be too low for a number of applications. In addition, the molecular weight build-up may occur not fast enough for efficient industrial production. A too high amount may lead to the formation of a gel like polyarylene ether sulfone. This may also not be desired from an aspect of the range of applicability of the polyarylene ether sulfone. Therefore, the polyarylene ether sulfone in the at least one block i) generally—if compound E is present—advantageously comprises from 0.5 to 5 mol % of compound E, such as 0.5 mol %, 1 mol %, 1.5 mol %, 2 mol %, 2.5 mol %, 3 mol %, 3.5 mol %, 4 mol %, 4.5 mol % or 5 mol % of compound E, based on the total amount of compounds A, D and E comprised in the polyarylene ether sulfone. Thereby, it may be preferred that it comprises from 0.5 to 4 mol % of compound E, based on the total amount of compounds A, D and E. It may be most preferred that it comprises from 0.1 to 3 mol % of compound E, based on the total amount of compounds A, D and E comprised in the polyarylene ether sulfone Polyarylene Ether Sulfone The polyarylene ether sulfone may comprise only —O— and —SO$_2$— groups which link arylene groups. It is also possible that it comprises further groups, which link arylene groups. Groups such as —CO—, —S—, —NN— or alkylene groups can be mentioned as examples thereof. Thereby a polyarylene ether sulfone which comprises a certain amount of —CO— groups or at least one further group is included in the disclosure. In this case less than 50 mol-% of the theoretically possible —SO$_2$— groups present in the polyarylene ether sulfone are replaced by —CO— groups. Generally, not more than about 30 to 40% of the theoretically possible —SO$_2$— groups present in the polyarylene ether sulfone are replaced by —CO— groups. If present in the polyarylene ether sulfone typically 1 mol-% or more, preferably 5 mol-% or more of the theoretically possible —SO$_2$— groups present in the polyarylene ether sulfone may be replaced by —CO— groups. Thus, for instance from 1 to 20 mol-% of the theoretically possible —SO$_2$— groups present in the polyarylene ether sulfone may be replaced by —CO— groups.

It may be preferred that the polyarylene ether sulfone comprises at least one unit of the general formula I (unit U1)

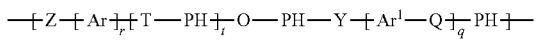

(I), where the definitions of the symbols t, q, Q, T, Y, Ar and Ar$^1$ are as follows:

r: 0, or 1 t, q: independently of one another 0, or 1, or 2, or 3,

Q, T, Y: independently of one another in each case a chemical bond or group selected from —O—, —S—, —SO$_2$—, S=O, C=O, —N=N—, and —CR$^a$R$^b$—, where R$^a$ and R$^b$ independently of one another are in each case a hydrogen atom or a C1 to C12-alkyl, C1 to C12-alkoxy, C3 to C12-cycloalkyl, or C6 to C18-aryl group, and where at least one of Q, T, and Y is —SO$_2$—

Z: a group derived from ISOSO, ISOMA or ISOID

Ar and Ar$^1$: independently of one another an arylene group having from 6 to 18 carbon atoms and where Ar, Ar$^1$, PH independently of another can have 0 to 4 —SO$_3$X groups, with the proviso that the polyarylene ether sulfone comprises at least one repeat unit U1 where at least one of Ar, Ar$^1$ and PH has at least one SO$_3$X group.

The person skilled in the art appreciates that the number of repeat units U1 where at least one of Ar, Ar$^1$ and PH has at least one SO$_3$X group comprised in the polyarylene ether sulfone depends on the amount of compound C.

If, within the abovementioned preconditions, Q, T or Y is a chemical bond, this then means that the adjacent group on the left-hand side and the adjacent group on the right-hand side are present with direct linkage to one another via a chemical bond.

However, it may be preferable that Q, T, and Y in formula I are selected independently of one another from —O— and —SO$_2$—, with the proviso that at least one of the group consisting of Q, T, and Y is —SO$_2$—.

If Q, T, or Y is —CR$^a$R$^b$—, R$^a$ and R$^b$ independently of one another are in each case a hydrogen atom or a C1 to C12-alkyl, C1 to C12-alkoxy, or C6 to C18-aryl group.

It may be preferred that C1 to C12-alkyl comprises linear and branched, saturated alkyl groups having from 1 to 12 carbon atoms. The following moieties may be mentioned in particular: C1 to C6-alkyl moiety, e.g. methyl, ethyl, n-propyl, isopropyl, n-butyl, see-butyl, 2- or 3-methylpentyl, and longer chain moieties, e.g. unbranched heptyl, octyl, nonyl, decyl, undecyl, lauryl, and the singly branched or multi-branched analogs thereof.

Alkyl moieties that can be used in the abovementioned C1 to C12-alkoxy groups are for instance the alkyl moieties defined above having from 1 to 12 carbon atoms. C3 to C12-cycloalkyl may in particular comprise C3 to C8 cycloalkyl, e.g. cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and Ar¹ are independently of one another a difunctional C6 to C18-arylene group. Proceeding from the starting materials described above or below respectively, Ar may preferably derive from an electron-rich aromatic substance that is very susceptible to electrophilic attack, whereby it may be hydroquinone, resorcinol, dihydroxy-naphthalene, in particular, it may be 2,7-dihydroxynaphthalene, or 4,4'-biphenol. Ar¹ may preferably be an unsubstituted difunctional C6- or C12-arylene group.

It may particularly be preferred that the difunctional C6 to C18-arylene groups Ar and Ar¹ are phenylene groups, and independently of one another e.g. 1,2-, 1,3-, and 1,4-phenylene, naphthylene groups, e.g. 1,6-, 1,7-, 2,6-, or 2,7-naphthylene, or also the difunctional arylene groups that derive from anthracene, from phenanthrene, or from naphthacene.

It may be preferable that Ar and Ar¹ are independently of one another 1,4-phenylene, 1,3-phenylene, naphthylene, in particular 2,7-dihydroxynaphthylene, or 4,4'-biphenylene.

The person skilled in the art appreciates that Ar, Ar¹ and PH may be unsulfonated or have 1 to 4 $SO_3X$ groups whereby the amount and the distribution of the with $SO_3X$ groups depends on how much and what type of compound C is comprised in the polyarylene ether sulfone.

It may be preferred that the polyarylene ether sulfone comprises at least one of the following repeat units U1 of formula Ia to Id (whereby the $SO_3X$ groups which may be present on the phenylene moieties are not depicted):

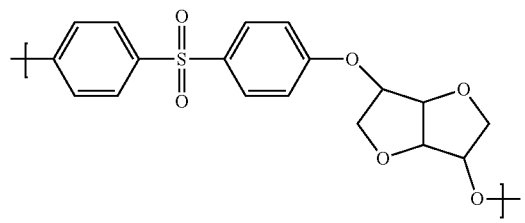

(Ia)

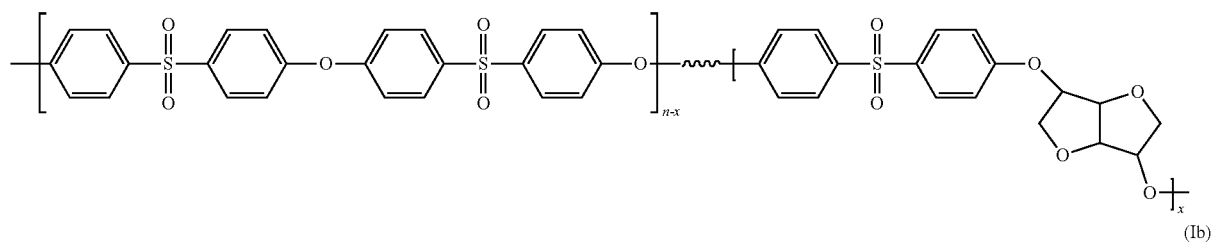

(Ib)

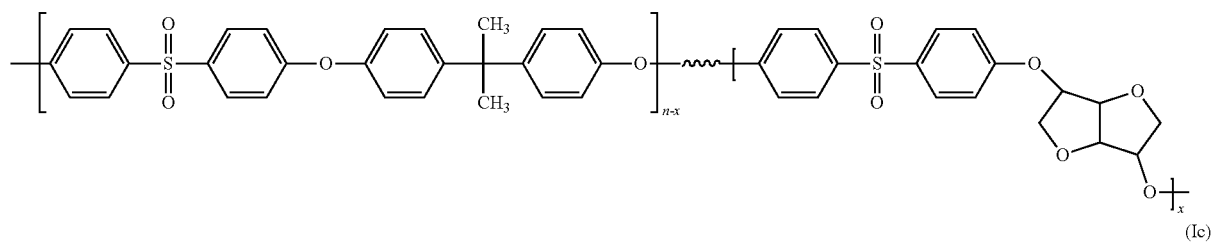

(Ic)

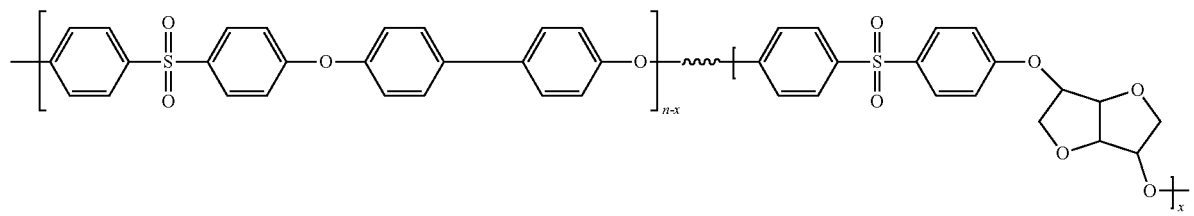

(Id)

wherein x is from 0.05 to 1 and n is 1

The polyarylene ether sulfone may particularly preferably have repeat units U1 where Ar is 1,4-phenylene with 0 to 4 $SO_3X$ groups, t is 1, q is 0, T and Y are $SO_2$, with the proviso that the polyarylene ether sulfone comprises at least one repeat unit U1 wherein Ar and/or PH comprise at least one $SO_3X$ group. This polyarylene ether copolymer may be termed a polyether sulfone (PESU) type polyarylene ether (formula Ia or Ib respectively).

The polyarylene ether sulfone may particularly preferably have repeat units U1 where Ar is 1,4-phenylene with 0 to 4 $SO_3X$ groups, t is 1, q is 0, T is $C(CH_3)_2$, and Y is $SO_2$, with the proviso that the polyarylene ether sulfone comprises at least one repeat unit U1 wherein Ar and/or PH comprise at least one $SO_3X$ group This polyarylene ether sulfone may be termed a polysulfone (PSU) type polyarylene ether (formula Ic).

The polyarylene ether sulfone may particularly preferably have repeat units U1 where Ar is 1,4-phenylene with 0 to 4 $SO_3X$ groups, t is 1, q is 0, T is a chemical bond, and Y is $SO_2$, with the proviso that the polyarylene ether sulfone comprises at least one repeat unit U1 wherein Ar and/or PH comprise at least one $SO_3X$ group. This polyarylene ether sulfone may be termed a polyphenylene sulfone (PPSU) type polyarylene ether (formula Id).

For the purposes of the present disclosure, abbreviations such as PPSU, PESU, and PSU are in accordance with DIN EN ISO 1043-1:2001.

Optionally the polyarylene ether sulfone may comprise at least one additional repeat unit U2. Said at least one repeat unit U2 can preferably be of formula IIa to IIo below (whereby the $SO_3X$ groups which may be present on the phenylene moieties are not depicted).

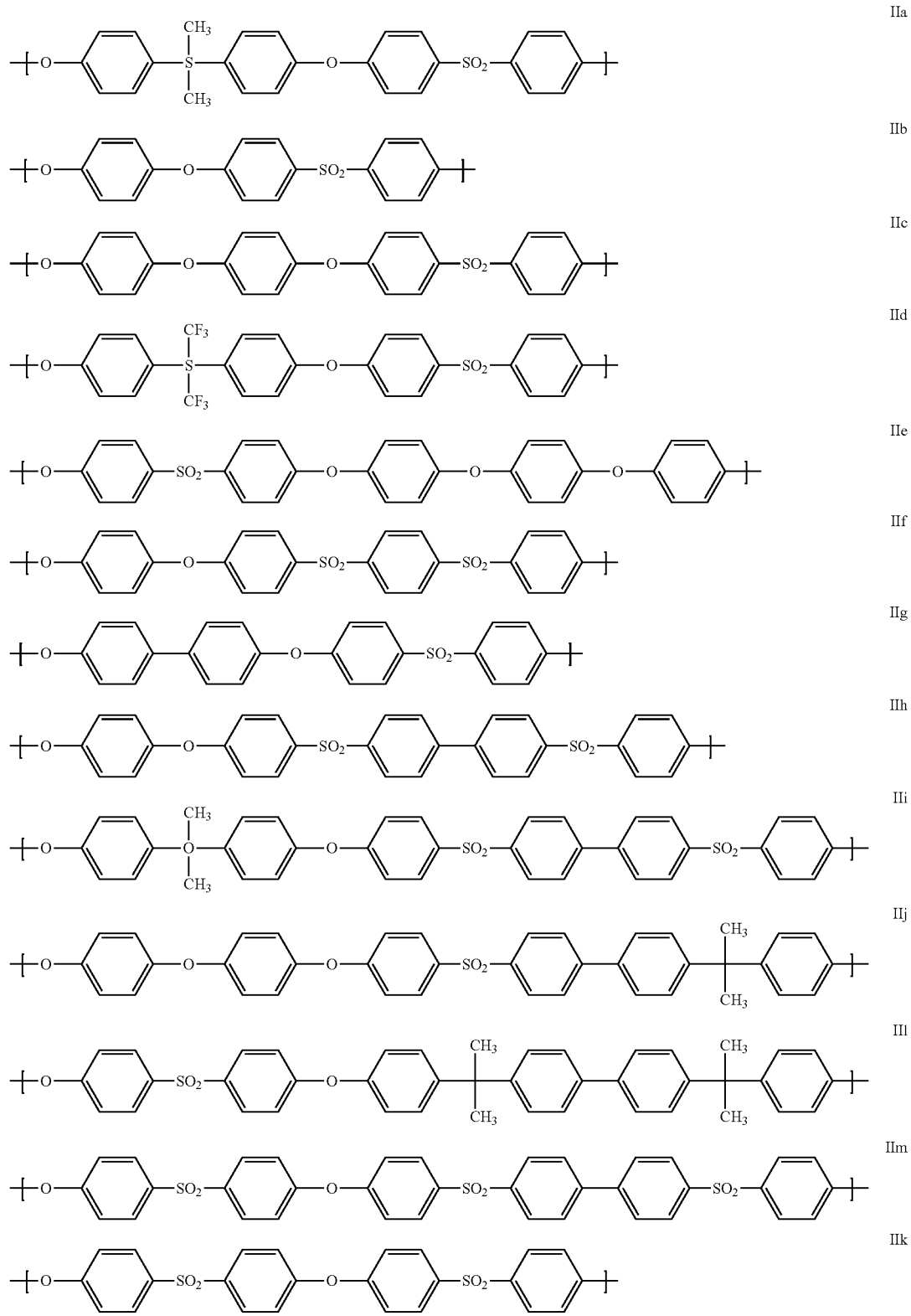

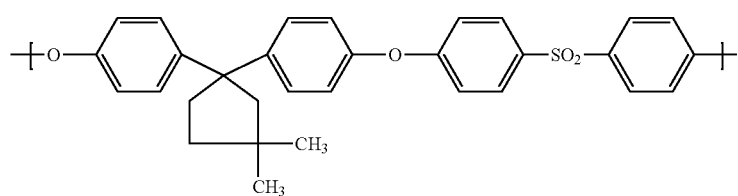

IIn

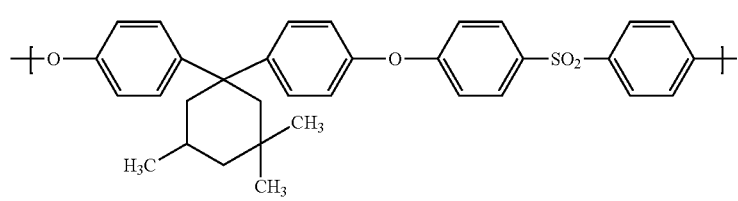

IIo

Units U2 of the general formula II that may particularly preferred are units IIa, IIg and/or IIk.

The polyarylene ether sulfone which comprises compound E comprises at least one unit U3. This can—and this may be preferred—be derived from a unit U1 and compound E.

The person skilled in the art will appreciate that the at least one unit U3 structurally incorporates unit U1 as described above as well as compound E as described above in any of the possible combinations thereof.

Therefore, the molecular structure of the polyarylene ether comprising repeat units U3 can for instance for a PESU type polyarylene ether sulfone be schematically represented as comprising units of formula IIIa and/or IIIb (whereby the $SO_3X$ groups which may be present on the phenylene rings are not depicted).

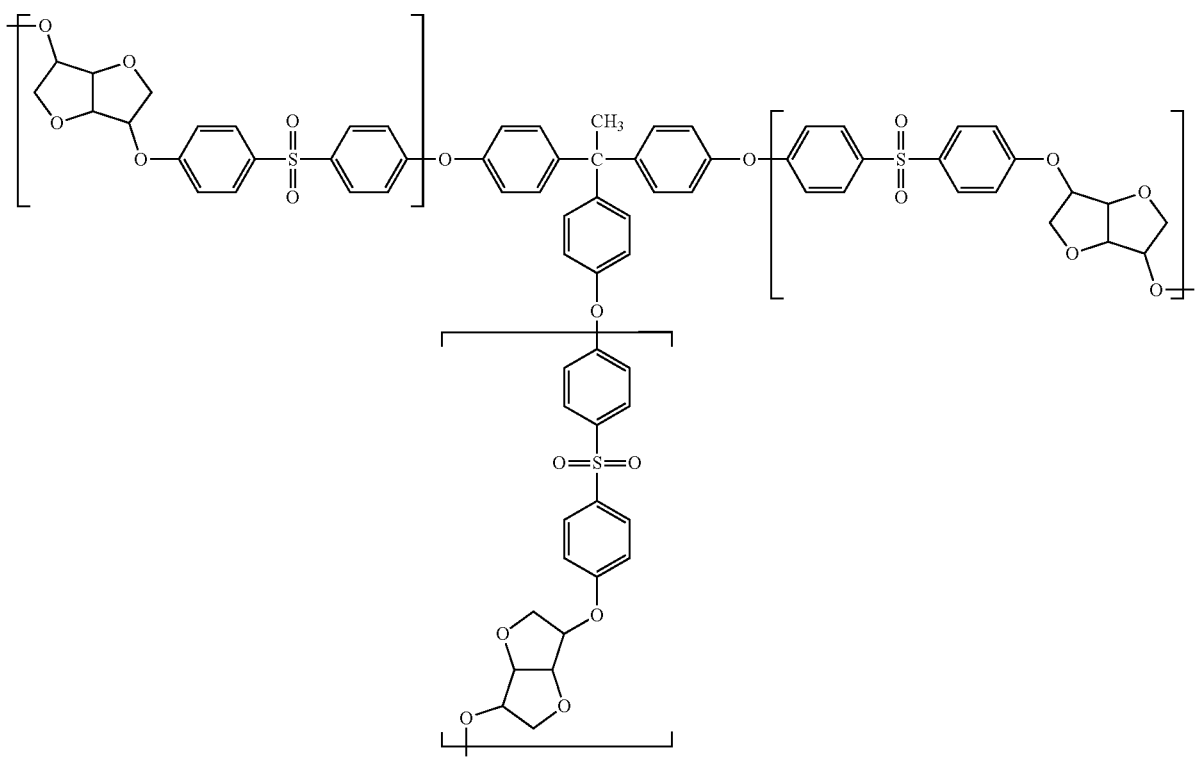

(IIIa)

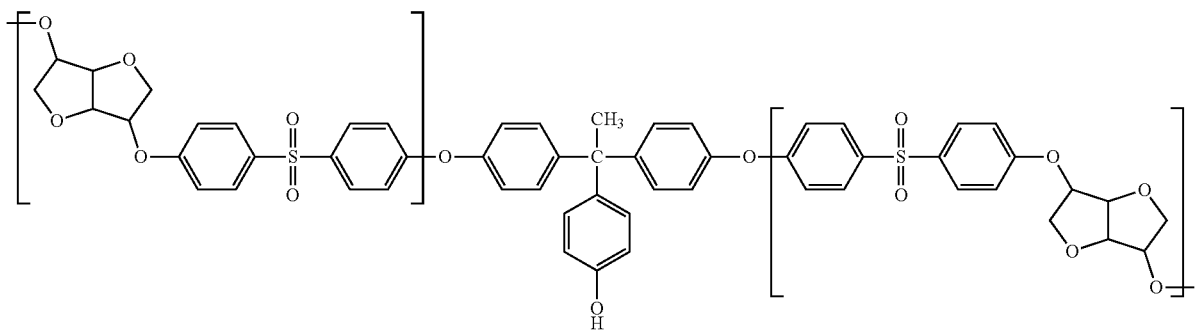
(IIIb)

The polyarylene ether sulfone may comprise the units U1, U2 and/or U3 in a statistical manner.

The person skilled in the art will appreciate that the molar ratios of the at least one unit U1 and the at least one unit U3 will depend on the amounts of compound E.

The nature of the end groups of the polyarylene ether sulfone is not particularly limited. Generally, it may depend on if reactive or non-reactive end groups are desired as end groups. Reactive end groups may for instance be preferred if it is intended to polymerize the polyarylene ether sulfone with at least one further monomer or polymer to yield a copolymer such as a block copolymer or a polymer network. Possible end groups are phenolic OH end groups or phenolate end groups, phenolic alkoxy end groups, among which —OCH$_3$ end groups may be preferred, amino end groups, among which —NH$_2$ may be preferred, halogen end groups, which can in particular be —F or —Cl. Cl may be most preferred among the halogen end groups. It is also possible that the end groups are phenolic anhydride end groups. The end groups can be of one type or can be different from each other. Generally, it may be preferred that the end groups are Cl—, OH— and/or —OCH$_3$. Often inert end groups are accessible by endcapping reactive endgroups. In the case that the polyarylene ether sulfone is intended for an application which is accessible by a method of production through solution, such as solution spinning or casting from solution, endcapping may not be required. A polyarylene ether sulfone which is not endcapped may in particular be useful in conjunction with membrane production. In this case a polyarylene ether sulfone which has Cl and/or OH end groups may be advantageous.

The polyarylene ether sulfone can preferably have a relative viscosity of 0.20 to 1.30 dl/g, especially of 0.30 to 0.95. According to the solubility of the polyarylene ether sulfone, the relative viscosity can be measured in 1% by weight N-methylpyrrolidone solution, in mixtures of phenol and dichlorobenzene, or in 96% sulfuric acid, in each case at 20° C. or 25° C.

The polyarylene ether sulfone can preferably have a mean molecular weight Mn (number average) in the range from 2000 to 75 000 g/mol, especially 5000 to 45 000 g/mol, determined by GPC.

The weight-average molar mass Mw of the polyarylene ether copolymer may preferably be from 10 000 to 200 000 g/mol, in particular it may be from 15 000 to 150 000 g/mol and it may be particularly preferably be from 18 000 to 100 000 g/mol, determined by means of gel permeation chromatography in dimethylacetamide as solvent against narrowly-distributed polymethyl methacrylate as standard (calibration between 800 to 1 820 000 g/mol), using 4 columns (pre-column, 3 separation columns based on polyester copolymers) operated at 80° C. The flow rate was set to 1 ml/min, injection volume was 100 μl. Detection was done using an RI-detector.

The polyarylene ether sulfone disclosed can advantageously be prepared by a process which comprises reacting
a) isosorbide, isomannide, isoidide or a mixture thereof (compound A) and
b) at least one difunctional compound comprising non-sulfonated a dihalodiaryl sulfone (compound B)
with
c) at least one sulfonated dihalodiaryl sulfone (compound C).

The process disclosed can also comprise that compounds A, B and D is reacted with compound C. It is also possible that the process comprises reacting compounds A, B and E with compound C. Further it is possible that the process comprises reacting compounds A, B, D and E with compound C. Preference is mostly given to a process comprising reacting compounds A and B with C, or comprising reacting compounds A, B and E with compound C.

Compounds A, B, C, D and E are described above.

Generally, monomeric compounds A, B, C, and if present D and/or E are employed as starting compounds, which means that the reaction generally does not start from the prepolymers of compounds A, B, C, and if present D and/or E.

The starting compounds enter into a polycondensation reaction to give the polyarylene ether sulfone which can typically be carried out in the presence of at least catalytic amounts of a base. It may be carried out in the absence or as it may be preferred the presence of a solvent L. A reaction mixture is formed. The components of the reaction mixture are generally reacted concurrently. The individual components may be mixed in an upstream step and subsequently be reacted. It is also possible to feed the individual components into a reactor in which these are mixed and then reacted. It may be preferred that the reaction is carried out in one stage. This means that the deprotonation of compound A and if present compound D and if present E which carry OH groups and also the condensation reaction thereof with compounds B and C takes place in one single reaction stage without isolation of the intermediate products.

The preparation of polyarylene ethers with simultaneous control of the end groups is in general known to those skilled in the art and is more specifically described in detail below. For the polyarylene ether sulfone it can for instance be achieved by the control of the amounts of functional groups of compounds A, B, C and if present D and/or E which they have prior to being polymerized, that is to say as starting compounds. The ratios of the starting compounds to be used derive in principle from the stoichiometry of the polycondensation reaction which proceeds with theoretical elimination of hydrogen halide, such as hydrogen chloride, and are established by the person skilled in the art in a known manner.

It is generally preferred that the molar ratios of the functional groups of the starting compounds which are reactive towards each other are controlled or adjusted. Thus, the molar ratios of halogen groups and the functional groups which are reactive towards halogen—such as in many cases hydroxy groups—can vary, depending on factors such as control of end groups or control of reaction speed and molecular weight. It can be equimolar. In the alternative the molar ratio of the halogen groups can be higher than that of the functional groups which are reactive towards halogen—such as in many cases hydroxy groups—or vice versa. Thus, for instance the molecular weight of a polyarylene ether sulfone comprising phenolate end groups can be adjusted using a defined off-set of the stoichiometric ratio between the starting compounds A and C over compound B. Generally the molar ratios are not more than about 3:1 to about 1:3, such as about 2:1 to about 1:2. With respect to obtaining higher molecular weights the molar ratios are mostly nearer equal molecular ratios.

As disclosed above compounds E and D may have functional groups which are reactive towards halogen. Compound E may also have halogen functional groups. Likewise, compound B has two halogen groups or may have one halogen group and one group reactive towards halogen. Thus, the ratio of the starting compounds and with them those of the functional groups have to be chosen accordingly.

For instance, to increase the number of phenolic OH end groups, an excess of OH end groups is preferable. It can be preferred that, the ratio of halogen end groups to phenolic OH end groups is adjusted by controlled establishment of an excess of starting compound with hydroxy functional groups. On a molar basis the ratio of OH groups to halogen groups may in this case be from 1.005 to 1.2, especially from 1.01 to 1.15, most preferably from 1.02 to 1.1.

In cases in which more stable end groups are sought it may be preferred to increase the number of halogen end groups, in particular phenyl halogen, such as chlorine, whereby an excess of halogen end groups, such as chlorine end groups is preferable. In a preferred embodiment, the ratio of functional groups and groups, such as preferred in many cases hydroxy, to halogen end groups is adjusted by controlled establishment of an excess of halogen containing compounds. Preferably in this case, on a molar basis the ratio of halogen to OH groups may be from 1.005 to 1.2, especially from 1.01 to 1.15, most preferably from 1.02 to 1.1.

Preferably, the conversion in the polycondensation is at least 0.9, which ensures a sufficiently high molecular weight.

In principle the process can be carried out in the absence of a solvent. In particular in cases in which a very light color of the polyarylene ether copolymer is aimed at, the process can mostly more advantageously be carried out in the presence of at least one solvent (solvent L).

Solvent L which may be preferred in the context of the present invention is an organic, especially aprotic polar solvent. Suitable solvent L can also have a boiling point in the range from 80 to 320° C., especially 100 to 280° C., preferably from 150 to 250° C. A suitable aprotic polar solvent is, for example, a high-boiling ether, ester, ketone, asymmetrically halogenated hydrocarbon, anisole, dimethylformamide, dimethyl sulfoxide, sulfolane, dimethylacetamide (DMAC), N-methyl-2-pyrrolidone (NMP) or N-ethyl-2-pyrrolidone (NEP) or any combination thereof. To enhance solubility solvent L can for instance be a mixture of 2 to 3 solvents. In most cases it can be sufficient to use two or more preferably only one solvent.

Solvent L may especially be DMAC, NMP or NEP or any mixture thereof.

Preferably, the process comprises reacting compounds A, B, C and if present D and/or E, in at least one aprotic polar solvent mentioned, such as in DMAC, NMP or NEP or any mixture thereof, where especially N-methyl-2-pyrrolidone may be preferred. Thereby it may be preferable to proceed from a mixture of starting compounds A, B, C and if present D and/or E. To modify the formation of the polyarylene ether sulfone it is of course also possible to add certain compound A, B, C and if present D and/or E at various times during the reaction. It may in particular be preferred starting from a mixture of one compound A, one compound B and one compound C or with a mixture of one compound A, one compound B, one compound C and one compound E in at least one aprotic polar solvent, such as in DMAC, NMP or NEP or any mixture thereof, whereby NMP may be especially preferred.

To separate the water released during the reaction an azeotrope-forming co-solvent like toluene or chlorobenzene may be used. Typically, it may be preferred not to employ such azeotrope-forming co-solvent. Separation of the water together with the solvent L during the heating process may generally be preferred. Loss of solvent L can be accounted for by for instance starting with a larger amount of solvent L or by adding solvent L during the reaction. The control of the viscosity increase during the reaction can also be a means to control the molecular weight of the polyarylene ether sulfone.

The process disclosed may in general comprise that compounds A, B, C and if present D and/or E are reacted in the presence of at least one base. The person skilled in the art is aware that functional groups such as OH groups, for instance phenolic OH groups are preferably reacted in the presence of at least one base in order to increase the reactivity toward halogen substituents of compounds B and/or C.

Said at least one base can typically be a hydroxide, carbonate or bicarbonate. Thus, it may be a mixture of at least one hydroxide and at least one carbonate or a mixture of at least one carbonate with at least one bicarbonate. Thereby at least one anhydrous alkali metal carbonate may be preferred. It may also be possible to for instance use a mixture of different hydroxides or different carbonates or different bicarbonates. It may be preferred to use one base. It may be preferred that the one base is one alkali metal carbonate. In particular, sodium carbonate, potassium carbonate, calcium carbonate, or a mixture thereof may be preferred, very particularly it may be preferred that potassium carbonate is used as the base.

From the aspect of reaction speed and if a very light colored polyarylene ether sulfone is aimed at especially potassium carbonate with a volume-weighted mean particle size of less than 100 micrometers, for instance from 5 to 80 μm, preferably from 10 to 60 μm, such as 20 μm, 25 μm, 30 μm, 35 μm, 40 μm, 45 μm, 50 μm or 55 μm or any uneven μm size between 5 to 100 μm, determined at a suspension of the solid in chlorobenzene/sulfolane 60/40 using a Malvern Mastersizer 2000 instrument.

A combination which can be particularly preferred is DMAC, NMP or NEP or any mixture thereof as solvent and potassium carbonate as base, especially potassium carbonate of a size of less than 100 µm. One combination which can be particularly preferred is NMP as solvent and potassium carbonate as base, especially potassium carbonate of a size of less than 100 µm, for instance from 5 to 80 µm, preferably from 10 to 60 µm, such as 20 µm, 25 µm, 30 µm, 35 µm, 40 µm, 45 µm, 50 µm or 55 µm or any uneven µm size between 5 to 100 µm, determined as described above.

The reaction of compounds A, B, C and if present D and/or E can be performed at a temperature at which the reaction proceeds with an acceptable speed and yields a polyarylene ether sulfone in an acceptable quality such as having the molecular weight and the molecular weight distribution as desired. Generally, the process can be carried at out at temperatures of from 80 to 250° C., preferably from 100 to 220° C. When the process is carried out in the presence of solvent L and ambient pressure the upper temperature limit is usually determined by the boiling point of solvent L. In particular, when the process is carried out in the absence of a solvent the stability of the reactants can be a factor limiting the reaction temperature.

While the person skilled in the art may adapt the reaction temperatures and times to the specific polyarylene ether sulfone to be produced, reaction temperatures in the range of from 180 to 205° C. may be applicable and temperatures from 185 to 195° C. may be preferred. At the latter temperatures the reaction may take from 2 to 20 hours, e.g. from 3 to 18 hours, for instance from 5 to 15 hours. In particular, if the process is carried out in solvent L, such as NMP said conditions may be the preferred ones.

It may be possible to employ in the process at least one compound with one functional group reactive towards reactive groups comprised in a polymeric chain (compound F). Compound F It may be preferred that one compound F is used. Thereby it may be possible to control the chain length of the polyarylene ether sulfone. Generally, a reaction with compound F following the polycondensation reaction for instance after a conversion of at least 0.9 is reached may be preferred. It may be preferred that compound F is at least one aliphatic organic halogen. The result is further reaction of reactive groups, which can be endgroups, in particular hydroxy end groups.

The polyarylene ether copolymer then comprises in reacted form compound F. Such polyarylene ether sulfone is usually stabilized inter alia against further extension of the polymer chain during the course of further processing.

Preferred at least one aliphatic organic halogen compound is at least one alkyl halide, in particular alkyl chloride, having linear or branched alkyl groups having from 1 to 10 carbon atoms, which can in particular be a primary alkyl chloride, particularly preferably methyl halide, in particular methyl chloride.

The reaction with compound F can preferably be carried out at a temperature of from 90° to 160° C., in particular from 100° C. to 150° C. The time can vary widely and is usually at least 5 minutes, in particular at least 15 minutes. The reaction time can generally preferably be from 15 minutes to 8 hours, in particular from 30 minutes to 4 hours.

Various methods can be used for the reaction of compound F, more specifically the at least one aliphatic organic halogen. The amounts used of compound F, more specifically the at least one aliphatic organic halogen compound, can moreover be stoichiometric or represent an excess, where the excess can by way of example be up to a 5-fold excess. For example, it may be preferred that the at least one aliphatic organic halogen is added continuously, in particular via continuous introduction in the form of a stream of gas.

Reaction with compound F can be carried out in a separate process unit or as it may be preferred directly in the polycondensation reactor.

If the process is carried out in the presence of solvent L and after the reaction is completed, further solvent L, which can for instance be the solvent L in which the reaction was carried out such as DMAC, NMP, NEP or any mixture thereof, whereby NMP may be preferred, is typically added to cool the reaction mixture down. Dimethyl lactamide (DML) is another preferred solvent L. The reaction mixture can for instance be cooled to the temperature range at which compound F can be reacted with the polyarylene ether sulfone in a separate process unit or the polycondensation reactor as described above. Thereafter, the reaction mixture may be further cooled if needed, whereby around 80° C. may be preferred. If the polyarylene ether sulfone is not reacted with compound F it may be preferred that the reaction mixture is cooled to around 80° C. At this temperature the reaction mixture, which typically is a dispersion, is taken out of the respective process unit, typically comprising a reaction vessel and is transferred into at least one separation unit. Said separation unit may preferably comprise a filtration unit to separate the salt formed during the reaction, e.g. potassium chloride from the reaction mixture. Depending on the viscosity of the dispersion, this process may take minutes or hours such as from 30 min to 24 h. During that time the filtrate may also let to cool down to ambient temperature (23° C.). The product may then be isolated, such as via precipitation due to addition of a non-solvent. This can for instance be a mixture of water and at least one polar aprotic solvent. It may be preferred to use a mixture of water and a solvent L, such as DMAC, NMP, NEP or any mixture thereof, where by NMP may be preferred. Thereby the water can generally be used in portions greater than the solvent L such as DMAC, NMP, NEP or any mixture thereof, whereby NMP may be preferred. Precipitation in a water/NMP-mixture (e.g. around 80/20 by weight) may be most preferred. The precipitation can also be in an acidic medium, such as in a water/NMP-mixture comprising an acid. Suitable acids are for example organic or inorganic acids for example carboxylic acid such as acetic acid, propionic acid, succinic acid or citric acid and mineral acids such as hydrochloric acid, sulfuric acid or phosphoric acid. The obtained powder is collected typically filtered, and then typically washed and finally dried, whereby temperatures from 80 to 150° C. in the vacuum can be used.

In addition to the disclosure above the person skilled in the art can resort to methods accessible to him by application of his general knowledge. Production processes that lead to a polyarylene ether sulfone are described by way of example in Herman F. Mark, "Encyclopedia of Polymer Science and Technology", third edition, volume 4, 2003, chapter "Polysulfones" pages 2 to 8, and also in Hans R. Kricheldorf, "Aromatic Polyethers" in: Handbook of Polymer Synthesis, second edition, 2005, pages 427 to 443. More details regarding the synthesis of OH-terminated polyarylene ether sulfones are for instance given in R. Viswanathan, B. C. Johnson, J. E. McGrath, Polymer 25 (1984) 1827. Information on the control of the molecular weight are for instance disclosed in A. Noshay, M. Matzner, C. N. Merriam, J. Polym. Sci. A-1 9 (1971) 3147.

Some examples of polyarylene ether sulfone which are within this disclosure and which may be prepared according to the process described above and which may be among the preferred are given in Table 1 below It is a general advantage of the polyarylene ether sulfone disclosed herein that is has a high Tg and nevertheless shows a low solution viscosity. It can be manufactured from monomers which are free from fluorine or bromine functional groups, thus by a more environmentally friendly process and a less expensive one.

TABLE 1

| Polyarylene ether sulfone of the type | Compound A ISOSO [mol %] | Compound B [mol %] | Compound C [mol %] | Compound D [mol %] | Compound D type | Compound E [mol %] |
|---|---|---|---|---|---|---|
| PPSU | 5 to 100 | 80 to 99 | 1 to 20 | 0 to 95 | BP | no |
| PESU-ISOSO | 92.5 to 99.25 | 80 to 99 | 1 to 20 | 0 | | 0.5-5 |
| PPSU | 7.5 to 94.75 | 80 to 99 | 1 to 20 | 5 to 85 | BP | 0.5-5 |
| PESU | 5 to 100 | 80 to 99 | 1 to 20 | 0 to 95 | DHDPS | no |
| PESU | 7.5 to 94.75 | 80 to 99 | 1 to 20 | 5 to 85 | DHDPS | 0.5-5 |
| PSU | 7.5 to 94.75 | 80 to 99 | 1 to 20 | 5 to 85 | Bis A | 0.5-5 |
| PSU | 5 to 100 | 80 to 99 | 1 to 20 | 0 to 95 | BisA | no |

The basis for the mol % is as described above.

The use of at least one polyarylene ether sulfone disclosed herein or obtainable by the process disclosed herein, for instance of the PPSU, the PESU or the PSU type, whereby it may be most preferable that the poylarylene ether copolymer comprises THPE, Isosorbide and non-sulfonated and sulfonated DCDPS in polymerized form for the production of coatings, fibers, films, foams, moldings and/or membranes is also disclosed herein.

A fiber is for example a more or less flexible structure which is thin in relation to the length. A fiber can be compact or hollow. A fiber can be round or almost round or can have a different cross-sectional shape. It can for instance be flat. A fiber can also be tubelike. A fiber may have a smooth surface or it may have pores or holes. A fiber can be obtained for example by an extrusion method. It may be more preferred that a fiber from at least one polyarylene ether sulfone, whereby generally one polyarylene ether sulfone is preferred, is obtained by a spinning method. Spinning from a solution can be advantageous if thermal stress on the at least one polyarylene ether sulfone is a concern. In a number of cases it can be advantageous to employ a solvent for the spinning which comprises or consists of solvent L, for example DMAC, NMP, NEP or any mixture thereof. In case the process is carried out in the presence of solvent L the spinning can for instance be carried out directly after the separation of the polyarylene ether sulfone from the salt. It is also possible to isolate the polyarylene ether sulfone first and then to dissolve it in the solvent to be used for the spinning. To improve the mechanical properties of a fiber it can be advantageous to spin the at least one polyarylene ether sulfone, whereby generally one polyarylene ether sulfone is preferred, which can be as it may be preferred—from solution by an electrospinning method, including magnetic electrospinning. Electrospinning may for instance be most preferred in case of the production of a fiber which is a nanofiber. Magnetic electrospinning may be employed for the production of nonwovens from the at least one polyarylene ether sulfone, whereby generally one polyarylene ether sulfone is preferred. As the electrospinning method requires that the melt or which may be preferred the solution is conductive it may not be necessary to separate the salt, all or essentially all of the salt from the reaction mixture after the reaction. A polyarylene ether sulfone which comprises compound A as sole diol may be preferred for the production of a fiber by an electrospinning method.

A membrane is for instance a separating layer. A membrane may be understood to mean an impermeable, partly impermeable or selectively permeable membrane, or a membrane which is permeable in one direction or a permeable membrane. The type of membrane is generally not restricted. The membrane can be a dense membrane which comprises virtually no pores and which in particular can be used for gas separation. It can be a porous membrane which comprises pores having a diameter in the range from 1 to 10000 nm and which is mainly used in micro-, ultra- and nanofiltration. Also, the membrane may for instance be a reverse osmosis (RO) membrane, a forward osmosis (FO) membrane, a nanofiltration (NF) membrane, an ultrafiltration (UF) membrane or microfiltration (MF) membrane. In many cases it may be preferred that the membrane is an UF, a NF or a MF membrane.

The polyarylene ether sulfone disclosed herein can be used in different filter membrane geometries. For instance, it can be used in a flat membrane and/or in a capillary-like hollow fiber membrane. The flow toward these membranes may take the form of a dead-end flow or of a crossflow.

The membrane may be produced using at least one polyarylene ether sulfone, whereby it can be preferred that it is produced from one polyarylene ether sulfone. Typically, the membrane can be prepared according to methods known to those skilled in the art. The membrane may for instance be manufactured by casting from a solution. Thereby a casting solution of at least one polyarylene ether sulfone in a solvent L, such as DMAC, NMP, NEP or any mixture thereof, whereby NMP may be preferred, can be prepared. Dimethyl lactamide I another preferred solvent L. Said casting solution typically contains at least one, as is preferred in many cases one, compound which can be removed by washing from the membrane. Said compound is often also termed as pore former. For the purposes of the manufacture of the membrane from at least one polyarylene ether sulfone, polyvinylpyrrolidone and/or polyethylene glycol (PEG) can often be used as pore former in a casting solution.

The membrane can be used in contact with water, a body fluid or a liquid in food production. The membrane can also be used for the separation of gases.

Thus, the membrane can be used in conjunction with water processing such as separation of solids or medical technology. Desalination can for instance be the desalination for industrial or medicinal purposes. It can also be the desalination of sea water or brakish water. In the medicinal or industrial fields, the membrane can for instance be used for the recovery of vaccines or antibiotics from fermentation broth, laboratory grade water purification, water disinfection—including removal of viruses, removal of endocrins or pesticides. The membrane can be for instance be used in conjunction with blood treatment such as dialysis. It can for instance be employed for the manufacture of blood treatment devices.

A liquid in food production can for instance be a beverage which may be cleared by a membrane disclosed herein, such as an alcoholic or non-alcoholic beverage such as a fruit juice or beer. Likewise, the membrane may be used in the processing of milk or products derived from milk.

An article comprising at least one membrane can for instance be a filtration system such as a dialysis filter apparatus, a module row or a module rack.

A molded article can essentially be a solid geometric body which can be produced, for example, by molding processes, injection molding, extrusion, calendering, rotomolding, foaming, blow-molding processes, forming processes or joining processes.

EXAMPLES

The examples below provide further explanation of the invention, but do not restrict the same.

Definitions and Abbreviations

Reaction time: time during which the reaction mixture was kept at 190° C.
CA contact angle
DCDPS: 4,4'-dichlorodiphenylsulfone
sDCPS disodium diphenylsulfone-4,4'-dichloro-3,3'-disulfonate
BP: 4,4'-dihydroxybiphenyl
ISOSO: isosorbide
NMP: N-methyl-2-pyrrolidone The particle size of the potassium carbonate was determined at a suspension of the solid in chlorobenzene/sulfolane 60/40 using a Malvern Mastersizer 2000 instrument.
Isolation and Testing of the Copolymers The copolymers obtained were isolated by dividing the filtrated reaction mixture into droplets and transferring the droplets into a precipitation bath. The precipitation solvent was desalinated water at room temperature. The precipitation height was 0.5 m. The throughput was appr. 2.5 l/h. The so obtained beads were then extracted with water at 85° C. for 20 h (water throughput 160 l/h). Thereafter the beads were dried under reduced pressure at a temperature below the glass transition temperature (Tg) to a residual moisture of less than 0.5 wt %.

The solution viscosity (V.N.) was determined using a solution of 0.01 g/ml polymer in NMP at 25° C. (DIN EN ISO 1628-1 (October 2012)).

The content of isosorbide and sDCDPS in the polyarylene ether sulfone was determined by $^1$H-NMR analysis on a $CDCl_3$ solution.

The Tg of the copolymers was determined by DSC-measurement with a heating rate of 10 k/min in the second heating process.

The contact angle (CA) of the polymers were measured against water on the respective polymer films, which were manufactured from a 25 wt % solution in NMP. The films were dried under reduced pressure at 80° C. for 48° C. The measurements were carried out at 23° C. with a DSA 100 analyzer (from Krüss GmbH). The values given in Table 2 are average values from 10 measurements.

The viscosity of the spinning solution was measured with a Brookfield rheometer at 60° C. at at 20 rpm using solutions having the following composition:

19 wt-% nonsulfonated polyarylene ether respectively polyarylene ether sulfone 6 wt-% polyvinylpyrrolidone K90 (Luvitec® powder from BASF SE)

75 wt-% NMP

Examples 1 to 7 according to the disclosure—Preparation of Polyarylene ether sulfones and Comparative Example C1 and C2—Preparation of a nonsulfonated Polyarylene ethers General Procedure:

In a vessel equipped with a stirrer, Dean-Stark-trap, nitrogen-inlet and temperature control, DCDPS, ISOSO, (and if present) sDCDPS, BP and potassium carbonate (volume average particle size of 33.2 µm) were suspended under nitrogen atmosphere in 1050 ml NMP. Under stirring the mixture was heated up to 190° C. within one hour. The water that was formed in the reaction was continuously removed by distillation. Potential solvent loss to be accounted for was monitored. Nitrogen is purged through the mixture and the mixture is kept at 190° C. for the reaction time. After this time 1950 ml NMP were added to cool down the mixture to room temperature (within one hour) under nitrogen. To remove the potassium chloride formed the reaction mixture was filtrated. The obtained polymer solution was then precipitated in water, the resulting polymer beads were separated and then extracted with hot water (85° C.) for 20 h. Then the beads were dried at 120° C. for 24 h at reduced pressure (<100 mbar).

The amounts and materials employed as well as the properties are given in Tables 2 and 3 below.

The polyarylene ether sulfones according to this disclosure had lower solution viscosity in the spinning solution than the non-sulfonated polyarylene ethers. Thus, they were easier to process. They were suitable for the manufacture of membranes. Also, the polyarylene ether sulfone according to this disclosure had a higher Tg and a lower contact angle than ISOSO-free sulfonated polyarylene ether sulfone. In addition, the examples show that the viscosity number drops if more than 20 mol-% of s-DCDPS is used.

TABLE 2

| | Examples | | | | | | | | | | | |
|---|---|---|---|---|---|---|---|---|---|---|---|---|
| | C1 | 1 | 2 | C2 | 3 | 4 | C3 | 5 | 6 | C4 | 7 | C5 |
| DCDPS | | | | | | | | | | | | |
| [g] | 574.34 | 559.96 | 545.60 | 574.34 | 559.96 | 545.60 | 574.34 | 559.96 | 545.60 | 545.60 | 488.17 | 445.10 |
| [mol] | 2.00 | 1.95 | 1.90 | 2.00 | 1.95 | 1.90 | 2.00 | 1.95 | 1.90 | 1.90 | 1.70 | 1.55 |
| sDCDPS | Not | | | Not | | | Not | | | | | |
| [g] | used | 24.563 | 49.12 | used | 24.563 | 49.12 | used | 24.563 | 49.12 | 49.12 | 147.38 | 221.06 |
| [mol] | | 0.05 | 0.10 | | 0.05 | 0.10 | | 0.05 | 0.10 | 0.10 | 0.3 | 0.45 |
| ISOSO | | | | | | | | | | Not | | |
| [g] | 73.07 | 73.07 | 73.07 | 146.14 | 146.14 | 146.14 | 219.21 | 219.21 | 219.21 | used | 73.07 | 73.07 |
| [mol] | 0.50 | 0.50 | 0.50 | 1.00 | 1.00 | 1.00 | 1.50 | 1.50 | 1.50 | | 0.50 | 0.50 |
| BP | | | | | | | | | | | | |
| [g] | 279.32 | 279.32 | 279.32 | 186.21 | 186.21 | 186.21 | 93.11 | 93.11 | 93.11 | 372.42 | 279.32 | 279.32 |
| [mol] | 1.50 | 1.50 | 1.50 | 1.00 | 1.00 | 1.00 | 0.50 | 0.50 | 0.50 | 2.00 | 1.50 | 1.50 |
| K2CO3 | | | | | | | | | | | | |
| [g] | 304.052 | 304.052 | 304.052 | 317.88 | 317.88 | 317.88 | 331.70 | 331.70 | 331.70 | 293.00 | 304.0 | 304.0 |
| [mol] | 2.20 | 2.20 | 2.20 | 2.30 | 2.30 | 2.30 | 2.40 | 2.40 | 2.40 | 2.12 | 2.20 | 2.20 |

TABLE 3

| Examples | C1 | 1 | 2 | C2 | 3 | 4 | C3 | 5 | 6 | C4 | 7 | C5 |
|---|---|---|---|---|---|---|---|---|---|---|---|---|
| Properties | | | | | | | | | | | | |
| V.N. [ml/g] | 70.9 | 68.5 | 67.9 | 68.7 | 67.9 | 68.8 | 68.0 | 69.1 | 69.2 | 83.2 | 65.6 | 41.5 |
| Amount ISOSO [mol %] | 23.5 | 24.0 | 24.0 | 48.9 | 48.7 | 47.9 | 74.3 | 74.2 | 74.3 | — | 23.9 | 23.7 |
| Amount sDCDPS [mol %] | — | 2.2 | 4.7 | — | 2.3 | 4.6 | — | 2.2 | 4.6 | 4.7 | 14.5 | 21.8 |
| Tg [° C.] | 229 | 232 | 236 | 234 | 237 | 240 | 239 | 241 | 244 | 227 | 240 | 242 |
| CA [°] | 75 | 62 | 51 | 76 | 63 | 51 | 76 | 63 | 52 | 62 | 43 | 37 |
| η [Pa * s] | 24.6 | 23.1 | 20.1 | 29.0 | 26.5 | 24.3 | 31.0 | 28.7 | 27.1 | 32.1 | 20.4 | 21.5 |

The invention claimed is:

1. A polyarylene ether sulfone comprising in polymerized form
    A) isosorbide, isomannide, isoidide or a mixture thereof and
    B) at least one at least one nonsulfonated dihalodiaryl sulfone (compound B) and
    C) at least one sulfonated dihalodiaryl sulfone (compound C) and
    D) at least one tri- or higher functional monomer.

2. The polyarylene ether sulfone according to claim 1, comprising
    A) isosorbide.

3. The polyarylene ether sulfone according to claim 1, comprising
    from 20 to 99 mol-% of compound B and
    from 1 to 20 mol-% of compound C,
    based on the sum of the mol-% of compounds B and C.

4. The polyarylene ether sulfone according claim 1 wherein compound C is 4,4'-dichlorodiphenylsulfone-3,3'-disulfonic acid or 4,4'-dichlorodiphenylsulfone-3,3'-disulfonic acid disodium salt or a mixture thereof.

5. The polyarylene ether sulfone according to claim 1, comprising
    E) at least one triol.

6. The polyarylene ether sulfone according to claim 1, comprising
    E) 1,1,1-trishydroxyphenyl ethane.

7. The polyarylene ether sulfone according to claim 1, comprising in polymerized form at least one unit of the general formula (I)

where the definitions of the symbols t, q, Q, T, Y, Ar and $Ar^1$ are as follows:
    r: 0, or 1
    t, q: independently of one another 0, or 1, or 2, or 3,
    Q, T, Y: independently of one another in each case a chemical bond or group selected from —O—, —S—, —$SO_2$—, S=O, C=O, —N=N—, and —$CR^aR^b$—, where $R^a$ and $R^b$ independently of one another are in each case a hydrogen atom or a C1 to C12-alkyl, C1 to C12-alkoxy, C3 to C12-cycloalkyl, or C6 to C18-aryl group, and where at least one of Q, T, and Y is —$SO_2$— or —CO—,
    Z: a group derived from isosorbide, isomannide, isoidide
    Ar and $Ar^1$: independently of one another an arylene group having from 6 to 18 carbon atoms.

8. A process for the preparation of a polyarylene ether sulfone comprising reacting
    a) isosorbide, isomannide, isoidide or a mixture thereof and b) at least one nonsulfonated dihalodiaryl sulfone, with
c) at least one sulfonated dihalodiaryl sulfone.

9. The process according to claim 8 comprising reacting the monomers in the presence of a polar aprotic solvent in the absence of an azeotrope forming compound.

10. A method for preparing coatings, films, fibers, foams, membranes or molded articles comprising utilizing the polyarylene ether sulfone according to claim 1.

11. The method according to claim 10 for the preparation of membranes.

12. A fiber comprising a polyarylene ether sulfone according to claim 1.

13. A membrane comprising a polyarylene ether sulfone according to claim 1.

14. An article comprising a membrane according to claim 13.

15. A method comprising contacting the membrane according to claim 13 with water, a body fluid or a liquid in food production.

* * * * *